(12) United States Patent
Jarczyk et al.

(10) Patent No.: US 8,041,399 B2
(45) Date of Patent: Oct. 18, 2011

(54) MOBILE TERMINAL COMPRISING A SCALABLE DISPLAY

(75) Inventors: Alexander Jarczyk, Freising (DE); Roland Keller, Zürich (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/817,150

(22) PCT Filed: Feb. 8, 2006

(86) PCT No.: PCT/EP2006/050776
§ 371 (c)(1),
(2), (4) Date: Jan. 13, 2009

(87) PCT Pub. No.: WO2006/089842
PCT Pub. Date: Aug. 31, 2006

(65) Prior Publication Data
US 2009/0215496 A1  Aug. 27, 2009

(30) Foreign Application Priority Data
Feb. 25, 2005 (EP) .................................. 05004144

(51) Int. Cl.
*H04M 1/00* (2006.01)
(52) U.S. Cl. .................. 455/566; 455/556.1; 455/557; 455/90.1
(58) Field of Classification Search .............. 455/566, 455/552.1, 556.1, 556.2, 557, 575.1, 575.6, 455/90.1, 90.3; 345/84, 173
See application file for complete search history.

(56) References Cited

U.S. PATENT DOCUMENTS

| | | | |
|---|---|---|---|
| 2002/0118151 A1* | 8/2002 | Chen | 345/84 |
| 2003/0132921 A1* | 7/2003 | Torunoglu et al. | 345/173 |
| 2007/0013873 A9* | 1/2007 | Jacobson et al. | 353/30 |

OTHER PUBLICATIONS

English Translation of Written Opinion in PCT/EP2006/050776 dated Aug. 253, 2007; 6 pages.

* cited by examiner

*Primary Examiner* — John J Lee

(57) ABSTRACT

The invention relates to a mobile terminal provided with an interactive display device. The invention is characterized in that a pivotable projection device is provided and constructed in such a way that a variable size projection display and means for detecting the position and/or the movement thereof are obtainable.

18 Claims, 2 Drawing Sheets

MOBILE TERMINAL COMPRISING A SCALABLE DISPLAY

RELATED APPLICATIONS

Figure 1:
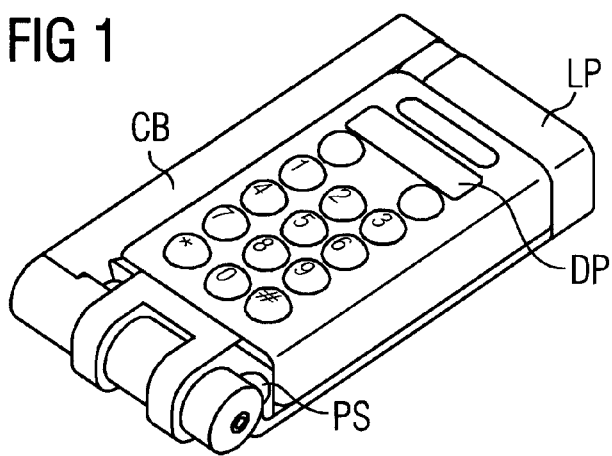

This application is a national phase application of PCT application PCT/EP/2006/050776, entitled "MOBILE SCALABLE DISPLAY TERMINAL, filed Feb. 8, 2006 and claims priority from European Patent Application 05004144.1 filed Feb. 25, 2005 entitled "MOBILE TERMINAL COMPRISING A SCALABLE DISPLAY". The aforementioned priority applications are hereby incorporated by reference in their entirety.

The invention relates to a mobile terminal according to the preamble of claim 1.

Examples of mobile terminals of this type include mobile radio devices, PDAs (personal digital assistants) or hybrid forms of these two devices such as "smartphones". These terminals allow the user to carry out a large number of different operations ranging from telephoning, with or without a camera, to comparatively complex inputs for drawing and/or calculation programs.

These terminals often have interactive display devices via which information can be output and commands can be input. Examples of such embodiments include touchscreens. The interactive display device may be also understood to be an input/output interface.

Also known are projection displays in which a corresponding image may be projected using a mini projector. Cameras having corresponding image processing software can be used for position protection or movement detection.

A scalable or adaptable housing form of the terminals is desirable for the requirements described at the outset. A general problem is that of scaling the shape and size of the housing, and in particular the size of the display, to the corresponding application. If, for example, a mobile telephone is used, various situations occur:
a. one-handed telephoning and writing of short messages,
b. two-handed noting-down of information during telephoning while standing, for example on a train, and while sitting without a desk or the like,
c. two-handed noting-down of information during telephone while sitting at a desk or the like.

At present, there are no possible forms of scaling for these applications. Either the devices are as large as a PDA (in which case they cannot really be used as a one-handed mobile telephone) or else they are sufficiently small (in which case they cannot really be used as devices for inputting text via a pin).

Clamshells, slider phones and handheld organisers are able selectively to assume at most two different housing states by enabling a small and a large LCD display. Also known are devices which provide the user with two different keypad sizes, although the size of the display is invariable.

The object of the invention is to specify a terminal of the type mentioned at the outset that is scalable with respect to the size of its interactive display.

According to the invention, this object is achieved by the features specified in claim 1.

Figure 2:
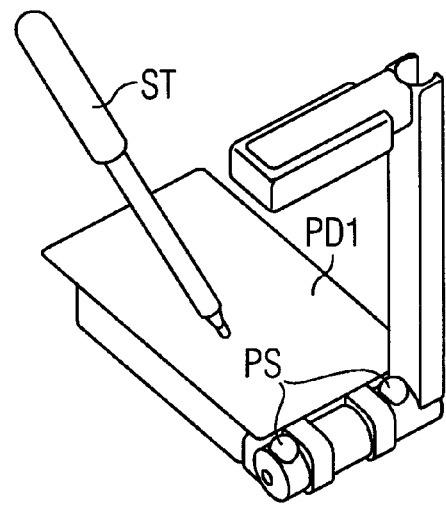
Figure 3:
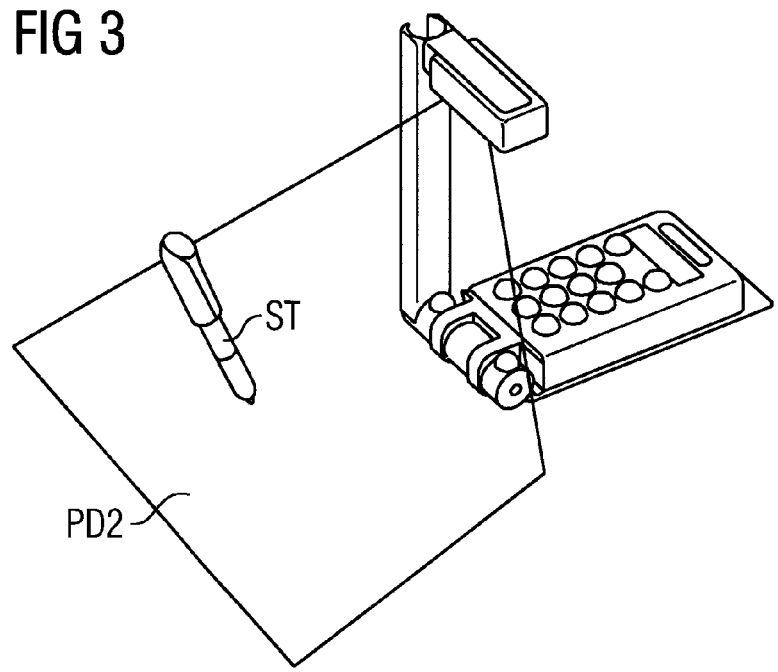
Figure 4:
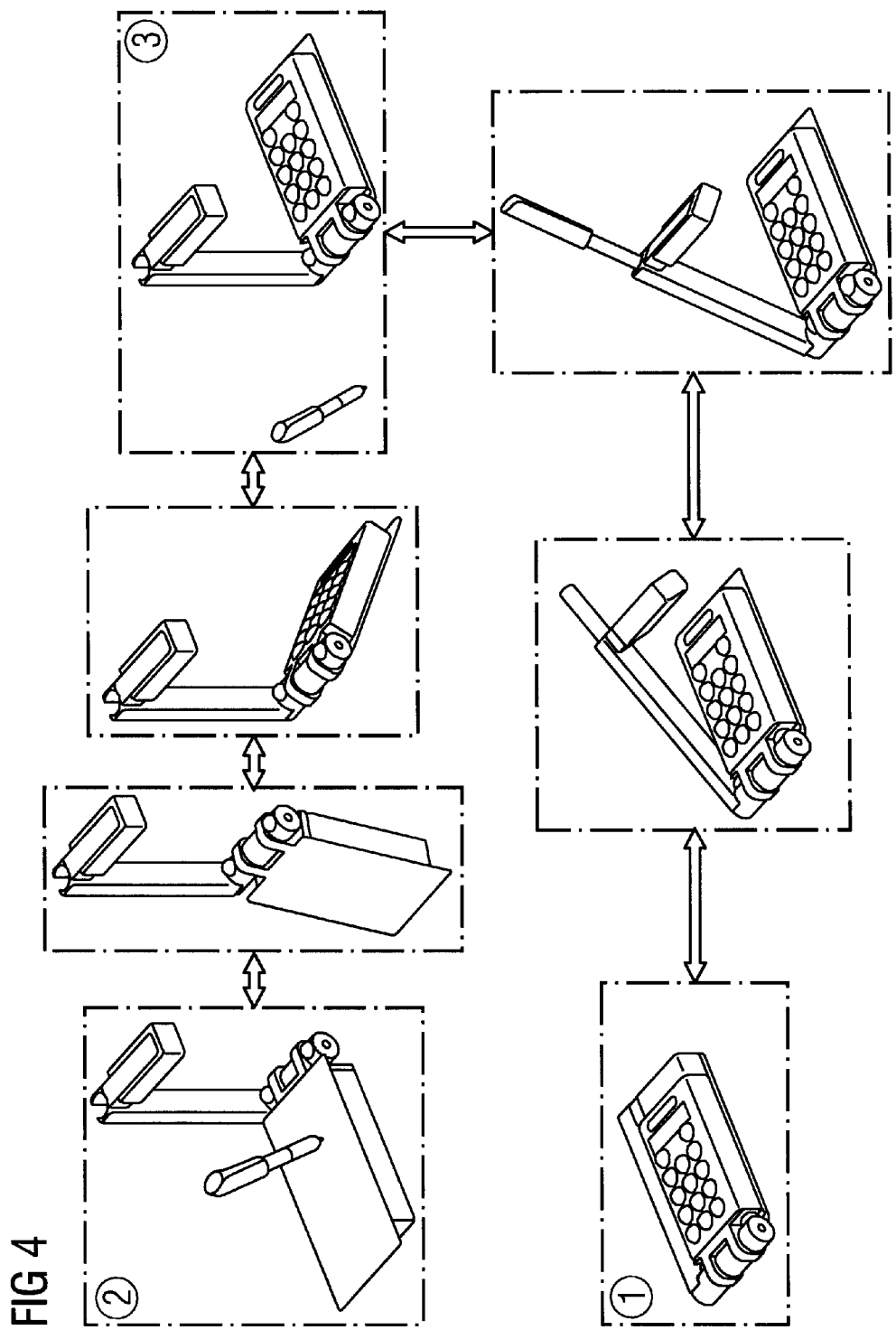

The invention will be described hereinafter with reference to an embodiment illustrated in the drawings, in which:

FIG. 1 shows a mobile radio device comprising an interactive display of a first size, FIG. 2 shows a mobile radio device comprising an interactive display of a second size, FIG. 3 shows a mobile radio device comprising and interactive display of a third size, and FIG. 4 shows the changes between various sizes.

The basic idea of the invention starts from a mobile terminal, for example a pure mobile radio device (see MF in FIG. 1) or smartphone. According to the invention, the terminal has a swivel clip (see CB in FIG. 1) via which a projection device (see LP in FIG. 1) is connected to the mobile radio device. The projection device is used for producing a size-variable projection display (see DP or PDx in FIG. 1) furthermore, the mobile radio device has means for positional and/or movement detection for inputs or movements on the projection display. Possible input means include a pin or a plurality of pins or one or more fingers. The projection display is able to assume various sizes. This will be described hereinafter in greater depth based on the detailed description. A camera may, for example, be provided as a positional and/or movement detection means.

FIG. 1 shows a mobile radio device MF which has on its side a swivel clip CB. The clip CB is, for example, C-shaped and has at one end a laser projector LP. The other end forms an axis of rotation via which the clip CB is rotatable about the housing of the mobile radio device MF. At this end, the clip CB has one or more position sensors as an alternative to a camera.

Differing sizes of the projection display are defined, for example, based on various positions of the swivel clip "CB". In a development of the basic idea, the present invention allows "switching" between a total of three different forms of housing.

The position illustrated in FIG. 1 of the clip CB allows the mobile radio device MF to be operated one-handed as a candy bar. In this case, the light from the projection system LP shines in the housing of the device MF and illuminates a display DP. The mirrors required for this purpose are of secondary importance for the invention and are not shown in detail.

The position illustrated in FIG. 2 of the clip CB allows two-handed operation while standing or without a base for the device MF. The clip CB is in a position in which the projector LP illuminates a back of the device MF. A projection display PD1 is produced in this position.

The position illustrated in FIG. 3 of the clip CB allows one-handed or two-handed operation of the device MF with a display surface markedly enlarged relative to FIG. 2. In this case, the projector LP projects onto a surface preceding the device MF and forms the projection display PD2.

As a result of the arrangement of the various components and the resultant rotation of the projector LP, the mobile radio device MF according to the invention facilitates displays DP, PD1 and PD2 of differing sizes.

In an embodiment of the invention, the sensors PS are arranged on the clip CB so as to detect in each display DP, PD1, PD2 the corresponding surface. Both the clip CB and its sensors PS move in this case rotationally.

The sensors PS may, for example, be in the form of ultrasonic sensors. These are preferably used to detect the position of an ultrasonic pin ST (see FIGS. 2 and 3).

The invention and the individual embodiments or developments provide the following advantages described, in particular with reference to FIG. 4.
a. The rigid arrangement of the pin position detection system (for example ultrasonic sensors) relative to the C-shaped carrier or clip CB of the projection device PD1 or PD2. All that is required in this case is calibration, as the folding of the carrier does not lead to any change in the spatial relationship of the sensors and the projection display PD.
b. The rigid arrangement of the projection device LP. In this case, it is possible to imagine the C clip CB as being fixedly suspended in space, specifically during transformation of the device MF from situation 2 to 3 (see FIG. 4) and back. The device MF is then turned toward this clip CB, while the projection continues as before. This gives rise to projection onto the back of the device MF in situation 2 and projection on to the table in situation 3. the projection surface is in this case optimised to the available surface area in such a way in situation 2 only the device and in situation 3 (if required), the maximum surface area (trapezium) is projected.

c. A switch which may be provided if necessary (but is not explicitly shown) in the C clip CB detects the position of the clip relative to the device MF. As a result, the projection or the application is switched off in situation 1 and switched on in situations 2 and 3. This also activates, for example, a variable hands-free device. The power supply, and therefore the operation of the pin position detection system, is also switched off in situation 1 and switched on in situations 2 and 3 (power save). Also using the switch, the small display can be switched off in situation 2 and optionally in situation 3 and switched on in situation S1. In this case, the display DP is a stand-alone display and not a means of reflection from the projection device LP.

The invention claimed is:

1. A mobile terminal comprising:
   an interactive display device configured to provide a projection device for outputting a size-variable projection display, wherein the projection device is further configured to provide the size-variable projection display by movement of a pivotable projection arm; and
   a component that is configured to detect a position and/or movement of the projection display.

2. The mobile terminal of claim 1 wherein the component is locally coupled to a display surface.

3. The terminal of claim 2, wherein the projection device and the component are coupled to the pivotable projection arm which is able to pivot at least partially about the terminal.

4. The mobile terminal of claim 2, wherein the projection device is configured to output the projection display on the display surface.

5. The mobile terminal of claim 4, wherein the component is configured to detect a user input within a region formed by the projection display.

6. The mobile terminal of claim 5, wherein the user input includes a user interaction with the display surface.

7. The mobile terminal of claim 2, wherein the display surface is included on a housing of the mobile terminal.

8. The mobile terminal of claim 2, wherein the display surface is included on a back surface of the mobile terminal.

9. The mobile terminal of claim 2, wherein the display surface is decoupled from the mobile terminal.

10. The mobile terminal of claim 1, wherein the projection device and the component are coupled to the projection arm which is able to pivot at least partially about the mobile terminal.

11. An interactive mobile device comprising:
    a projector for outputting a size-variable projection display, wherein the projector is configured to provide the size-variable projection display by movement of a pivotable projection arm; and
    a component that is configured to detect a user input within a region formed by the projection display based, at least in part, on a position and/or movement of the projection display.

12. The mobile device of claim 11, wherein the projector is configured to output the projection display on a display surface.

13. The mobile device of claim 12, wherein the user input includes a user interaction with the display surface.

14. The mobile device of claim 12, wherein the component is coupled to the display surface.

15. The mobile device of claim 12, wherein the display surface is included on a housing of the mobile device.

16. The mobile device of claim 15, wherein the display surface is included on a back surface of the mobile device.

17. The mobile device of claim 12, wherein the display surface is decoupled from the mobile device.

18. The mobile device of claim 11, wherein the projector and the component are coupled to the pivotable projection arm which is pivotable at least partially about the device.

* * * * *